United States Patent [19]
Schwartz

[11] 3,776,400
[45] Dec. 4, 1973

[54] TRAILER CONSTRUCTION

[75] Inventor: Robert B. Schwartz, Harper Woods, Mich.

[73] Assignee: Fruehauf Corporation, Detroit, Mich.

[22] Filed: June 12, 1972

[21] Appl. No.: 262,037

[52] U.S. Cl......... 214/38 BA, 280/43.23, 296/28 M
[51] Int. Cl............................................. B62d 33/08
[58] Field of Search................... 214/38 BA, 38 B; 280/43.23

[56] References Cited
UNITED STATES PATENTS
2,835,502  5/1958  Willetts...................... 280/43.23 X
3,661,282  5/1972  Herpich et al................... 214/83.3

Primary Examiner—Robert G. Sheridan
Attorney—J. King Harness et al.

[57] ABSTRACT

A trailer construction comprising a rear floor overlying and attached to the rear wheel bogie and a front floor, at least a portion of which is disposed for over-the-road hauling at a level vertically below the level of the rear floor to provide cargo space below the rear floor and forward of the bogie. The two floors are mounted on the trailer such that when the trailer is to be loaded or unloaded, the front floor portion may be elevated relative to the rear floor to cause the two floors to be brought into alignment and thereby provide a continuous interior floor surface over which fork lift trucks or other cargo handling equipment can be operated to load and unload cargo.

18 Claims, 16 Drawing Figures

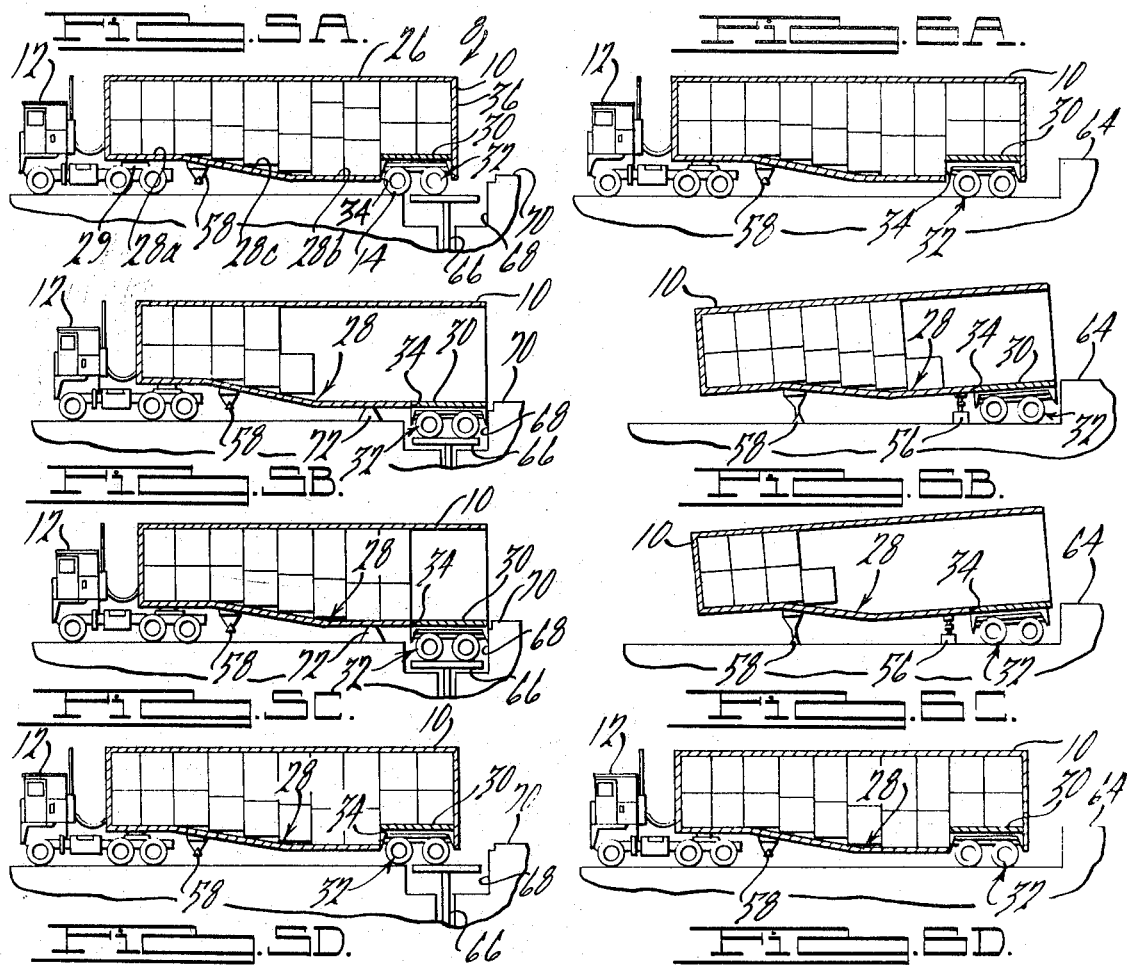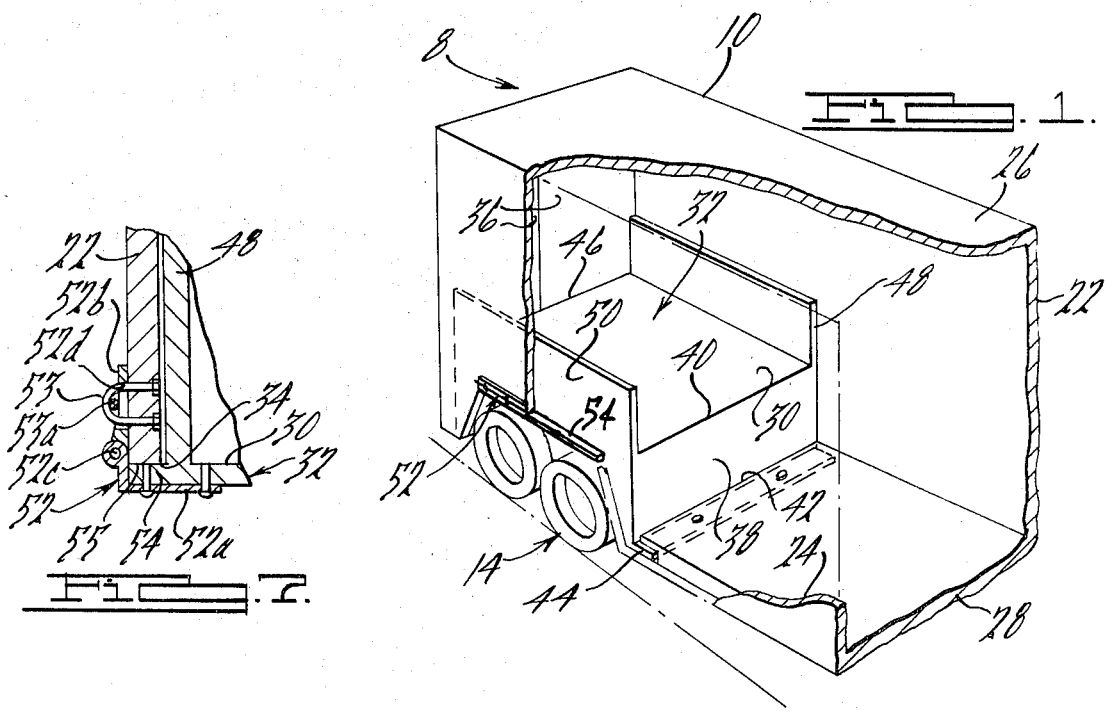

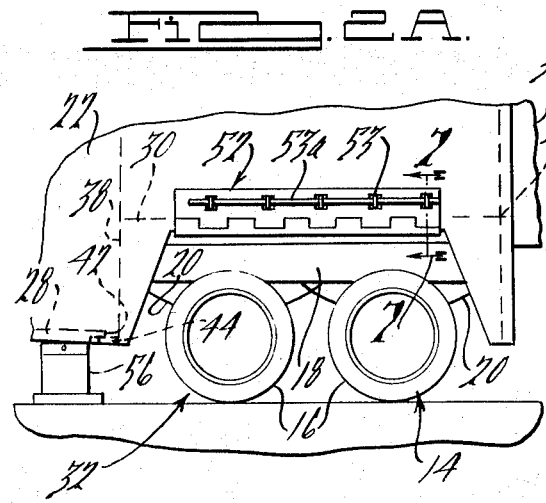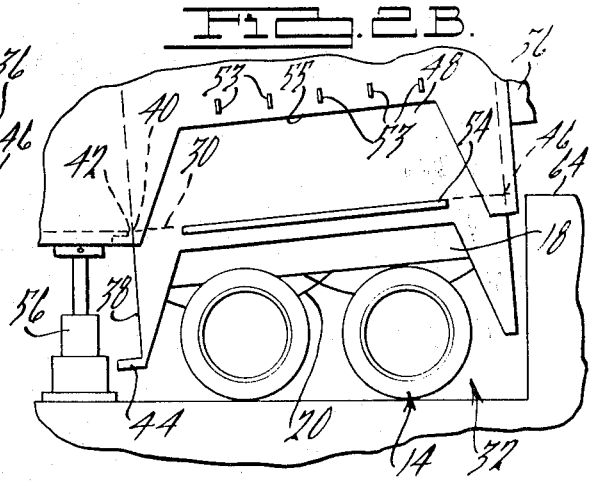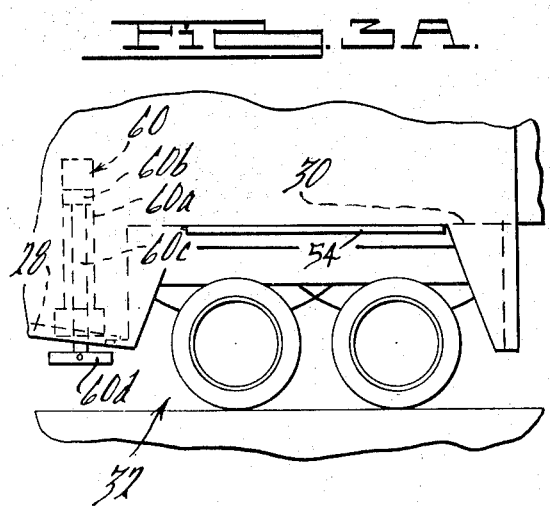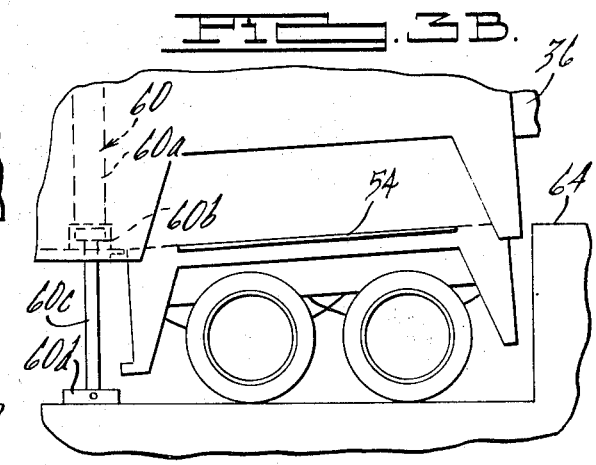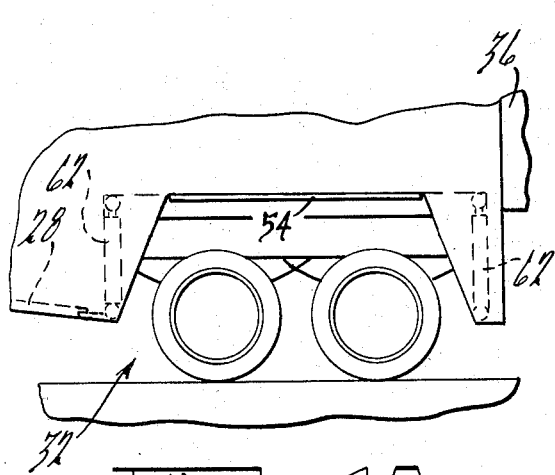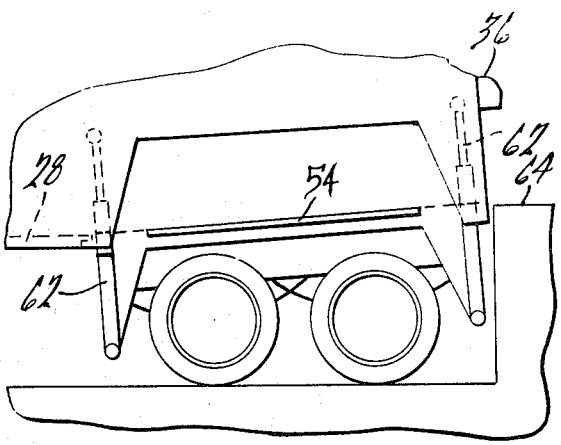

TRAILER CONSTRUCTION

BACKGROUND OF THE INVENTION

This invention relates to trailers and semi-trailers and in particular to an improved trailer construction.

At the present time, various restrictions on the maximum size and maximum capacity of trailers and semi-trailers are imposed by federal and state regulations. Restrictions on the length, width, and height accordingly limit the volumetric capacity of the trailer. In order to comply with these laws, every trailer and semi-trailer must come within the confines of a theoretical envelope which is defined by these dimensions.

A further restriction on the construction of trailers and semi-trailers is imposed by the desire on the part of the freight transportation industry to utilize mechanized cargo handling equipment and thereby keep its labor costs low. Thus, while increases in the volumetric capacities of trailers and semi-trailers are obviously desirable within the confines of existing regulations, such increases are generally unacceptable when they prohibit the use of such cargo handling equipment.

SUMMARY OF THE INVENTION

It is the primary object of this invention to provide improved trailers and semi-trailers which have significantly greater volumetric capacities within the confines of existing regulations and which also can accommodate mechanized cargo handling equipment for loading and unloading purposes.

Other objects of the present invention are: to increase the volumetric capacity of trailers by utilizing otherwise wasted space directly in front of the rear wheel bogie without impairing the ability to use automated cargo handling equipment for loading and unloading purposes; and to provide an improved trailer construction having a discontinuous floor which takes advantage of otherwise wasted space within the confines imposed by current dimensional restrictions and which may readily be converted into a continuous floor surface for loading and unloading cargo by means of automated cargo handling equipment.

The foregoing as well as additional objects and advantages of the invention are achieved by providing a trailer or semi-trailer having a rear floor overlying the rear wheel bogie and a front floor at least a portion of which is disposed for over-the-road hauling at a level vertically below the level of the rear floor to provide cargo space below the level of the rear floor and forward of the bogie. The two floors are mounted for movement relative to each other so that when the trailer is to be loaded or unloaded, the front floor portion may be brought into alignment with the rear floor to provide a continuous interior floor surface which can accommodate mechanized cargo handling equipment.

BRIEF DESCRIPTION OF THE DRAWINGS

The accompanying drawings disclose a preferred embodiment of the invention in accordance with the best mode presently contemplated for carrying out the invention.

FIG. 1 is a perspective view having portions broken away of the trailer construction of the present invention.

FIG. 2A is a side-elevational view of the lower rear portion of the trailer of FIG. 1 with the trailer arranged for over-the-road hauling.

FIG. 2B is a view similar to FIG. 2A but showing the trailer arranged for loading/unloading.

FIGS. 3A and 3B are views similar to FIG. 2A and 2B disclosing a first modification.

FIGS. 4A and 4B are views similar to FIG. 2A and 2B disclosing a second modification.

FIGS. 5A through 5D illustrate the trailer unloading-/loading sequence at one type of dock facility.

FIGS. 6A through 6D illustrate the trailer unloading-/loading sequence at another type of dock facility.

FIG. 7 is an enlarged sectional view taken along line 7—7 in FIG. 2A.

DESCRIPTION OF THE PREFERRED EMBODIMENT

Turning now to the drawings and first to FIGS. 1, and 5A, a semi-trailer 8 comprises a body 10 whose forward end is connected to a tractor 12 in conventional fashion and whose rear end is supported on a rear wheel bogie 14. Rear wheel bogie 14 is conventional and in FIG. 2A is illustrated as a two-axle bogie comprising two rear axle and wheel assemblies 16 mounted to the bogie frame 18 by means of suitable suspension systems 20. Continuing with FIGS. 1 and 5A, body 10 comprises side walls 22 and 24 and a top wall 26 which extend the full length of the body. Body 10 may be dimensioned in accordance with the trailer operator's requirements or specifications, but the maximum trailer volume will be limited by the dimensional restrictions imposed by prevailing laws and regulations.

The body floor, however, is a two-piece construction comprising a front floor 28 connected to side walls 22 and 24 and a rear floor 30 which as will become apparent is movably mounted on body 10. Front floor 28 has a generally horizontal forward floor section 28a (FIG. 5A) above the fifth wheel 29 of tractor 12, a generally horizontal rear floor section 28b and an intermediate floor section 28c which slopes downwardly and rearwardly from section 28a to section 28b. As also shown in FIG. 5A, which illustrates the arrangement of floors 28 and 30 for over-the-road hauling, forward floor section 28a is at approximately the same vertical level as rear floor 30 while floor sections 28b and 28c are disposed vertically below rear floor 30 to provide cargo space directly in front of rear wheel bogie 14. Conventional semi-trailers having flat, continuous horizontal one-piece floors fail to take advantage of the space between the tractor rear axle and the trailer rear wheel bogie. Alternatively, front floor 28 could be completely flat but inclining downwardly and rearwardly along its entire length; or floor section 28c could be co-planar with floor section 28b, having a step transition at floor section 28a. Thus, it will be appreciated that front floor 28 can be sloped in various fashions other than that illustrated and that the predominant factor which would restrict the floor contour would be the degree of flatness required to accommodate mechanized cargo handling equipment, for example a fork lift truck. Thus, the front floor, although having curved sloping portions, is generally planar in the sense that mechanized cargo handling equipment can operate on it.

Rear floor 30 is also generally planar in this same sense but is preferably substantially flat and lies in a horizontal plane directly above rear wheel bogie 14.

Rear floor 30 is mounted to bogie frame 18 by any suitable mounting arrangement, preferably as close to frame 18 as possible to maximize the interior volume directly overhead. Thus, rear floor 30 and rear wheel bogie 14 form a rear floor and bogie unit 32 disposed for over-the-road operation within a generally rectangular opening 34 at the rear of body 10 which is provided by terminating front floor 28 short of the trailer rear doors 36. As will be seen hereinafter, unit 32 is movably mounted on body 10 for movement out of opening 34 to bring rear floor 30 into alignment with front floor 28 and thereby permit mechanized cargo handling equipment to operate over the entire semi-trailer floor.

Preferably the mounting of unit 32 on body 10 includes a suitable sealing arrangement to protect the interior of the body from the external elements. For this purpose, a generally vertical front panel 38 (FIG. 1) is mounted on unit 32 and extends from the forward transverse edge 40 of rear floor 30 downwardly to the rear transverse edge 42 of front floor 28 so as to cover the opening which would otherwise exist between the two floors. Preferably, the lower edge of panel 38 has a forwardly turned flange 44 which underlaps rear edge 42 of front floor 28 when unit 32 is disposed within opening 34 for over-the-road hauling as illustrated in FIG. 1. The rear transverse edge 46 of rear floor 30 is suitably sealed against rear doors 36. A pair of side panels 48 and 50, which are co-extensive with the length of rear floor 30, serve to seal the sides of rear floor 30 to side walls 22 and 24, respectively. As will be seen hereinafter, side panels 48 and 50 also assist in guiding unit 32 for movement into and out of opening 34 and are preferably of sufficient height to laterally enclose the openings which would otherwise exist above the wheels of the rear wheel bogie when unit 32 is moved out of opening 34.

In order to securely lock unit 32 to body 10 for over-the-road operation, any sufficiently sturdy locking arrangement may be utilized. fFor example, a pair of piano-hinge type locks 52 may be mounted one each along each side of unit 32. As shown in FIG. 7 each lock 52 has a fixed plate 52a, a movable plate 52b and a hinge pin 52c. Plates 52a are right-angled pieces mounted against horizontal side ledges 54 on side panels 48 and 50. Ledges 54 serve to support body 10 along the upper horizontal edge of each wheel cut-out 55. With unit 32 locked to body 10 as shown in FIG. 7, movable plates 52b are swung to upright positions with staples 53 on side walls 22 and 24 extending through matching slots 52d in plates 52b. A locking bar 53a is inserted over each plate 52b and through staples 53 to lock unit 32 to body 10. Unit 32 is unlocked by removing bars 53a and swinging plates 52b outwardly and downwardly. Alternatively, unit 32 could be coupled to body 10 by a pinning arrangement wherein locking pins are used to lock unit 32 to body 10.

As previously stated, unit 32 is movably mounted on body 10 for movement into and out of opening 34. FIGS. 2, 3 and 4 dislcose three alternate arrangements for bodily displacing unit 32 on body 10 to align rear floor 30 with front floor 28 preparatory to unloading or loading the semi-trailer. In each of these three arrangements, the rear wheels of bogie 14 remain on the ground and the rear portion of front floor 28 is elevated from the ground to bring rear edge 42 of front floor 28 into alignment with forward edge 40 of rear floor 30.

When using any one of these three arrangements, it will be understood that locks 52 are first released to enable unit 32 to be bodily moved out of opening 34, and for the sake of clarity, the locks are not shown in FIGS. 2B, 3 and 4. Since these three arrangements are semi-schematically illustrated, it will be appreciated that the dimensions may not necessarily be exactly to scale.

FIGS. 2A and 2B illustrate the use of one or more external jacks, or hoists, 56 which are placed beneath front floor 28 just forward of flange 44. With the landing gear 58 (FIG. 6B) of the semi-trailer supporting the front of body 10, hoist 56 is actuated to engage and lift the rear portion of front floor 28. As the hoist rises, body 10 pivots on landing gear 58 and unit 32, which is unlocked from the body, moves out of opening 34. Side panels 48 and 50 serve to guide unit 32 on body 10 as the rear of the body moves in an upward, slightly arcuate path. Alternatively, it may be desirable to use guide rollers for guiding unit 32 on body 10; such rollers could be arranged in a "post rack" to guide unit 32 into and out of opening 34. When the transverse rear edge 42 of front floor 28 is vertically aligned with the transverse forward edge 40 of rear floor 30, operation of hoist 56 is discontinued. If desired, suitable stops (not shown) may be provided to arrest the outward movement of unit 32 once edges 40 and 42 are aligned. Preferably, edges 40 and 42 are complementary (as shown) rather than overlapping so that when the two floors 28 and 30 are in alignment, they provide a continuous transition between the two floors. Mechanized cargo handling equipment can now operate over the entire interior floor of the semi-trailer.

In FIGS. 3A and 3B, a pair of power cylinders 60 are mounted on body 10 at each side of the rear floor section 28b. Each cylinder 60 comprises a cylinder bore 60a within which a piston 60b travels in response to actuation of the cylinder. A piston rod 60c, which extends through a suitable opening in floor section 28b, is attached to piston 60b. As will be appreciated, suitable structure is provided for mounting cylinders 60 in generally vertical orientation on body 10. When cylinders 60 are actuated to extend piston rods 60c, a pedestal 60d on the outer end of each rod first engages the ground and continued actuation of the cylinders causes floor 28 to be moved in the same fashion as described for FIGS. 2A and 2B.

In FIGS. 4A and 4B four power cylinders 62 are connected between body 10 and unit 32, one each at each of the four corners of unit 32. As will be appreciated, suitable structure is provided for mounting each cylinder to the side walls of body 10. When cylinders 62 are actuated, front floor 28 moves in the same fashion as described for FIGS. 2A and 2B.

It will be appreciated that more specific details of the three arrangements illustrated in FIGS. 2–4 (i.e. the structure for mounting the power cylinders, the arrangement for guiding unit 32, the hydraulic systems, etc.) will depend upon the construction of the individual trailer and that, hence, it is unnecessary to describe such specific details for the purpose of disclosing the invention as hereinafter claimed.

FIGS. 6A–6D illustrate the sequence for unloading and loading semi-trailer 8 when utilizing the arrangement shown in FIGS. 2A and 2B. Semi-trailer 8 is first backed into the loading dock 64. Landing gear 58 is dropped and vertically extended to lift and support the front of semi-trailer so that tractor 12 can be uncoupled. Locks 52 are released after which floors 28 and 30 are aligned by actuating hoist 56. It will be observed that since the rear bogie wheels remain on the ground, rear floor 30 remains substantially aligned with dock 64, although rear floor 30 will tend to incline downwardly and forwardly due to its mounting on body 10. Because hoist 56 increasingly bears the weight of the rear of body 10 as it rises, the correspondingly reduced reaction of unit 32 with the ground will tend to relax suspensions 20 so that it is possible for the rear edge 46 of rear floor 30 to be misaligned with dock 64. Any misalignment may be corrected by subsequent vertical adjustment of landing gear 58. The semi-trailer may now be unloaded and reloaded using automated cargo handling equipment. When loading cargo on rear floor 30, it must be remembered to allow clearance between the top cargo and top wall 26 so that unit 32 can be returned without interference. Alternately, body 10 can be lowered after front floor 28 is loaded but before loading rear floor 30 so as to eliminate the possibility that the cargo on rear floor 30 will interfere with the travel of unit 32 back into body 10. This arrangement and also the arrangements of FIGS. 3 and 4 accommodate docks of standard height.

FIGS. 5A–5D show a different dock facility wherein the dock height is less than that of FIG. 6, being substantially the same as the elevation of rear edge 42 of front floor 28. The dock facility includes a hoist 66 within a well 68 in front of dock 70. When semi-trailer 8 is backed into dock 70, unit 32 is supported on hoist 66. Floor 28 is blocked as at 72 preparatory to operating hoist 66. After locks 52 are released, hoist 66 is lowered to drop unit 32 into well 68 and thereby bring rear floor 30 into alignment with the rear floor section 28c of front floor 28 and also into alignment with dock 70. The semi-trailer may now be unloaded and reloaded using mechanized cargo handling equipment.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In a trailer or semi-trailer having a cargo-carrying body and a rear wheel bogie supporting the rear of the body, the combination comprising a generally planar front floor and a generally planar rear floor, said rear floor being disposed vertically above said bogie and terminating in a transverse forward edge, said front floor having at least a portion thereof disposed for over-the-road hauling at a level vertically below the level of said rear floor and terminating in a transverse rear edge at a level vertically below the level of the transverse forward edge of the rear floor to provide cargo space below the level of the rear floor and forward of the bogie during over-the-road hauling and means for mounting the two floors on the body such that one of the two floors may be bodily moved relative to the other floor to cause the transverse rear edge of the front floor to be brought into alignment with the transverse forward edge of the rear floor to thereby provide a continuous transition between the two floors whereby mechanized cargo handling equipment may be operated over the two floors for unloading and loading cargo.

2. The combination of claim 1 wherein the rear floor is mounted on the bogie, and the rear floor and the bogie are bodily movable as a unit relative to the front floor.

3. The combination of claim 2 wherein the rear floor and the bogie are movable in a generally vertical direction.

4. The combination of claim 1 wherein the rear floor lies in a generally horizontal plane when the trailer is arranged for over-the-road hauling.

5. The combination of claim 4 wherein the transverse forward edge of the rear floor is disposed longitudinally rearwardly of the transverse rear edge of the front floor.

6. The combination of claim 5 wherein the transverse forward edge of the rear floor and the transverse rear edge of the front floor are complementary.

7. The combination of claim 1 further including actuating means operable for moving the two floors into and out of alignment.

8. The combination of claim 7 wherein the actuating means is mounted on the body.

9. The combination of claim 8 wherein the actuating means comprises power cylinder means.

10. The combination of claim 9 wherein the power cylinder means comprises a power cylinder having a cylinder bore, means mounting the cylinder bore on the one floor, a piston movable within the bore in response to actuation of the power cylinder, means operatively connecting the piston with the other floor such that when the piston is displaced within the cylinder bore in response to actuation of the cylinder, the one floor is bodily moved relative to the other floor.

11. The combination of claim 10 wherein the one floor is the front floor.

12. The combination of claim 11 wherein the cylinder bore is mounted adjacent the transverse rear edge of the front floor.

13. The combination of claim 12 wherein the cylinder bore is generally vertically mounted.

14. The combination of claim 1 further including means for locking the two floors together for over-the-road operation.

15. In a trailer or semi-trailer having a generally closed body comprising a top wall and a pair of transversely spaced side walls, said walls extending from the front to the rear of the trailer, the combination comprising a generally planar front floor extending from the front of the trailer to a location spaced forwardly of the rear of the trailer to thereby define an opening in the trailer floor, a rear floor and wheel bogie unit disposed within said opening, said unit comprising a rear wheel bogie and a generally planar rear floor overlying the bogie, and means for mounting the unit on the body such that the unit is movable into and out of the opening between an over-the-road operating position wherein the rear floor is disposed at a level vertically above at least a portion of the front floor and a load/unload position wherein the rear floor is substantially aligned with the front floor to thereby provide a continuous floor surface over which mechanized cargo handling equipment may be operated.

16. The combination of claim 15 wherein the front floor slopes downwardly in the rearward direction and terminates in a transverse rear edge disposed at a level vertically below the level of the rear floor when the trailer is arranged for over-the-road hauling.

17. The combination of claim 16 wherein the rear floor is disposed in a generally horizontal plane when the trailer is arranged for over-the-road hauling and wherein the unit is mounted on the body for generally vertical movement into and out of the opening.

18. The combination of claim 17 including actuating means on the trailer operatively connecting the front floor and the rear floor for causing the unit to be bodily displaced relative to the front floor.

* * * * *